US008370345B2

(12) United States Patent \
Spangler (10) Patent No.: US 8,370,345 B2 \
(45) Date of Patent: Feb. 5, 2013

(54) SNIPPET BASED PROXIMAL SEARCH

(75) Inventor: William Scott Spangler, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 12/757,365

(22) Filed: Apr. 9, 2010

(65) Prior Publication Data

US 2011/0252030 A1  Oct. 13, 2011

(51) Int. Cl. \
*G06F 17/30* (2006.01)

(52) U.S. Cl. ...................................................... 707/728
(58) Field of Classification Search .................. 707/728 \
See application file for complete search history.

(56) References Cited

U.S. PATENT DOCUMENTS

| | | | |
|---|---|---|---|
| 6,876,998 B2 | 4/2005 | Evans | |
| 7,299,221 B2 | 11/2007 | Alpha et al. | |
| 2005/0234880 A1* | 10/2005 | Zeng et al. | 707/3 |
| 2006/0167842 A1 | 7/2006 | Watson | |
| 2008/0010268 A1 | 1/2008 | Liao et al. | |
| 2008/0208833 A1* | 8/2008 | Basmov | 707/5 |

OTHER PUBLICATIONS

G. Salton et al., "Term-Weighting Approaches in Automatic Text Retrieval", Information Processing & Management, vol. 24, No. 5, pp. 513-523, Date: 1988.

* cited by examiner

*Primary Examiner* — Rehana Perveen \
*Assistant Examiner* — Alexander Khong \
(74) *Attorney, Agent, or Firm* — Shimokaji & Assoc., PC (57) ABSTRACT

The exemplary embodiments of the present invention provide a system, method and computer program products for a snippet based proximal search. A method comprises ranking the documents based on text that is similar to a text snippet. The ranking includes automatically generating proximity queries that include the text snippet, submitting the proximity queries, and collecting the document results. The method comprises selecting a plurality of highest ranked documents to form a subset of documents, extracting snippets from each document in the subset, and creating a vector space model for a set defined by a union of the extracted snippets and the text snippet. The method comprises ranking the extracted snippets according to their vector distances from the input text snippet, and ranking the documents within the subset of documents based on the ranking of the extracted snippets to determine a best matching document in view of the text snippet.

19 Claims, 7 Drawing Sheets

SNIPPET BASED PROXIMAL SEARCH

BACKGROUND OF THE INVENTION

1. Field of the Invention

The present invention generally relates to information search and retrieval; and more particularly to a system, method and computer program products for a snippet based proximal search.

2. Description of Background

The ability to find relevant material from a large collection of documents (i.e., search or document retrieval), is a well known and long studied problem. The current approach of finding relevant material in a large collection of documents is based on submitting terms to a keyword index of the document corpus. But these indexes, once built, make a limiting assumption about the granularity of the search task. For inputs, the search index assumes that a few well chosen words or phrases represent a precise specification of the desired output. For outputs, the search index assumes that the best document is the one that in its entirety, best matches the input.

These assumption are not always accurate for every search problem. In some cases the desired input is a sentence or paragraph of text, which are not easily forced into a single Boolean query. In such cases, the natural desired output would not necessarily be the document whose entire text best matches the input text, but one in which some subsection of the document is very similar to the text input. So, the content of each document is not as important as the individual sentences and paragraphs that make up each document. The search index is basically built at the wrong level of detail to provide this information.

SUMMARY OF THE INVENTION

Embodiments of the present invention provide a system, method and computer program products for providing a snippet based proximal search.

An exemplary embodiment includes a method for searching a collection of documents with at least one input text snippet, the collection of documents, and an index for the documents directed to both words and proximity of words. The method includes ranking the documents based on whether the documents include text that is similar to said at least one input text snippet. Ranking the documents further includes automatically generating proximity queries of combinations of words included in said at least one input text snippet, submitting the proximity queries to the index, and collecting the documents resulting from the proximity queries. The method further includes selecting a plurality of highest ranked documents to form a subset of documents, extracting snippets from each document in the subset of documents, and creating a vector space model for a set defined by a union of the extracted snippets and said at least one input text snippet, the vector space model including vectors that represent a frequency measure of terms in the set. The method still further includes ranking the extracted snippets according to their respective vector distances from said at least one input text snippet, and ranking the documents within the subset of documents based on the ranking of the extracted snippets to determine a best matching document in view of said at least one input text snippet.

Another exemplary embodiment includes a system for searching a collection of documents with at least one input text snippet, the collection of documents, and an index for the documents directed to both words and proximity of words. Briefly described, in architecture, one embodiment of the system, among others, can be implemented as follows. The system includes a ranking module that ranks the documents based on whether the documents include text that is similar to said at least one input text snippet. The ranking module further includes a proximity generation module that automatically generates proximity queries of combinations of words included in said at least one input text snippet, a query module that submits the proximity queries to the index, and a collection module that collects the documents resulting from the proximity queries. The system further includes a selection module that selects a plurality of highest ranked documents to form a subset of documents, a extraction module that extracts snippets from each document in the subset of documents, and a vector space model module that creates a vector space model for a set defined by a union of the extracted snippets and said at least one input text snippet, the vector space model module including vectors that represent a frequency measure of terms in the set. The system still further includes a snippet ranking module that ranks the extracted snippets according to their respective vector distances from said at least one input text snippet, and a document ranking module that ranks the documents within the subset of documents based on the ranking of the extracted snippets to determine a best matching document in view of said at least one input text snippet.

A further exemplary embodiment includes a computer program product for searching a collection of documents with at least one input text snippet, the collection of documents, and an index for the documents directed to both words and proximity of words. The computer program product includes a tangible storage medium readable by a computer system and storing instructions for execution by the computer system performing the method. The method includes ranking the documents based on whether the documents include text that is similar to said at least one input text snippet. Ranking the documents further includes automatically generating proximity queries of combinations of words included in said at least one input text snippet, submitting the proximity queries to the index, and collecting the documents resulting from the proximity queries. The method further includes selecting a plurality of highest ranked documents to form a subset of documents, extracting snippets from each document in the subset of documents, and creating a vector space model for a set defined by a union of the extracted snippets and said at least one input text snippet, the vector space model including vectors that represent a frequency measure of terms in the set. The method still further includes ranking the extracted snippets according to their respective vector distances from said at least one input text snippet, and ranking the documents within the subset of documents based on the ranking of the extracted snippets to determine a best matching document in view of said at least one input text snippet.

These and other aspects, features and advantages of the invention will be understood with reference to the drawing figure, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

One or more exemplary embodiments of the invention are described below in detail. The disclosed embodiments are intended to be illustrative only since numerous modifications and variations therein will be apparent to those of ordinary skill in the art.

Currently, many search indexes do contain information about the positional location of words in documents. The present invention leverages this information to scan the document collection for candidate textual patterns and find the section or sections that are most relevant to the search input. The approach then further dissects the text content of the best documents returned by the search index to find the nearest matching content to the original text input. This matching content is then returned to the user in the form of a "hit list" showing the document title, the relevant content, and a similarity score. The present invention creates a vector space representation of the document corpus, and the similarity of each document is measured against a vector created from the input text.

Typical search inputs are some variation of logical Boolean keyword expressions. For some applications, however, such an expression is not easily produced. Instead the desired input is a few sentences or a paragraph of text, and the desired output is the set of documents that contain the nearest matches to that text somewhere in their contents. These are called short text input "snippets". These short text input snippets are used in a process of finding documents that contain content similar to these snippets (i.e. "proximal search"). Given a search index over a document collection and a snippet input, the present invention provides an efficient, scalable method for discovering the most relevant snippets from within the candidate document collection.

First, described is the basic approach which assumes an input of single short snippet that is just one sentence in length. Then the basic approach will be subsequently generalized to snippets of arbitrary length.

Given a short text input such as: "unlocking the business value in unstructured information", first the stop words are removed to create the input for a proximity query. This cleaned text can then directly become the basis of a proximity query. One problem with this is that such a query is generally too precise and will find few if any matching documents. The answer is to make the query more general by gradually removing terms. First, one term is removed, thereby trying every possible query containing one fewer word than the original query. Next, two terms are removed, thereby trying every possible query containing two fewer words than the original query, and so on. This produces a query tree, which can be pruned at any point when any particular leaf of the tree generated greater than N results.

After generating the query tree, the results are collected into a document collection and sorted by smallest query to largest (size=number of returned documents). The document collection is created consisting of the original input and all individual sentences (snippets) extracted from all the documents that match one of the smallest result set queries. Starting with the smallest query, result sets are included until the collection contains a sufficient candidate population from which to evaluate. To be included, each sentence must contain at least one word from the original query. Typically this is around 2*N in size. However, the multiple can be adjusted based on how much time is available for the snippet based proximal search system to run and how thorough the search is to be.

Then a term vector space model is built over this collection of snippets. Each snippet is represented as a vector. The vector comprises weighted frequencies of the document features of words and phrases. The words and phrases that make up the document feature space are determined by first counting which words occur most frequently (in the most documents) in the text. A standard "stop word" list is used to eliminate words such as "and", "but", and "the". In one embodiment, the top K words are retained in the first pass, where the value of K may vary depending on the length of the documents, the number of documents and the number of categories to be created. After selecting the words in the first pass, a second pass is made to count the frequency of the phrases that occur using these words. A phrase is considered to be a sequence of two words occurring in order with out intervening non-stop words. Again, the search tree is pruned to keep only the K most frequent words and phrases. This becomes the feature space. A third pass through the data indexes the documents by their feature occurrences. Stemming may be used to if desired to create terms from similar word forms. In one embodiment, a term weighting scheme is utilized. This scheme emphasizes words with high frequency in a document, and normalizes each document vector to have unit Euclidean norm. For example, if a document were the sentence, "We have no bananas, we have no bananas today," and the dictionary consisted of only two terms, "bananas" and "today", then the unnormalized document vector would be {2 1} (to indicate two bananas and one today), and the normalized version would be:

$$[2/\sqrt{5}, 1/\sqrt{5}].$$

Then cosine distance is found between every snippet vector and the vector representing the text input. In one embodiment, the distance is measured using the cosine distance metric.

$$\cos(X, Y) = \frac{X \cdot Y}{\|X\| \cdot \|Y\|}$$

Each document is scored based on the nearest snippet (highest cosine value) in that document. Last, documents are sorted in decreasing cosine value. This allows for the ranking of the candidate documents, returning the best N in order of similarity.

The variation on this basic approach allows it to be applied to snippet inputs larger than one sentence, or to sentences that are too long to work in practice when $L^2-1$ queries might be generated.

Figure 1:
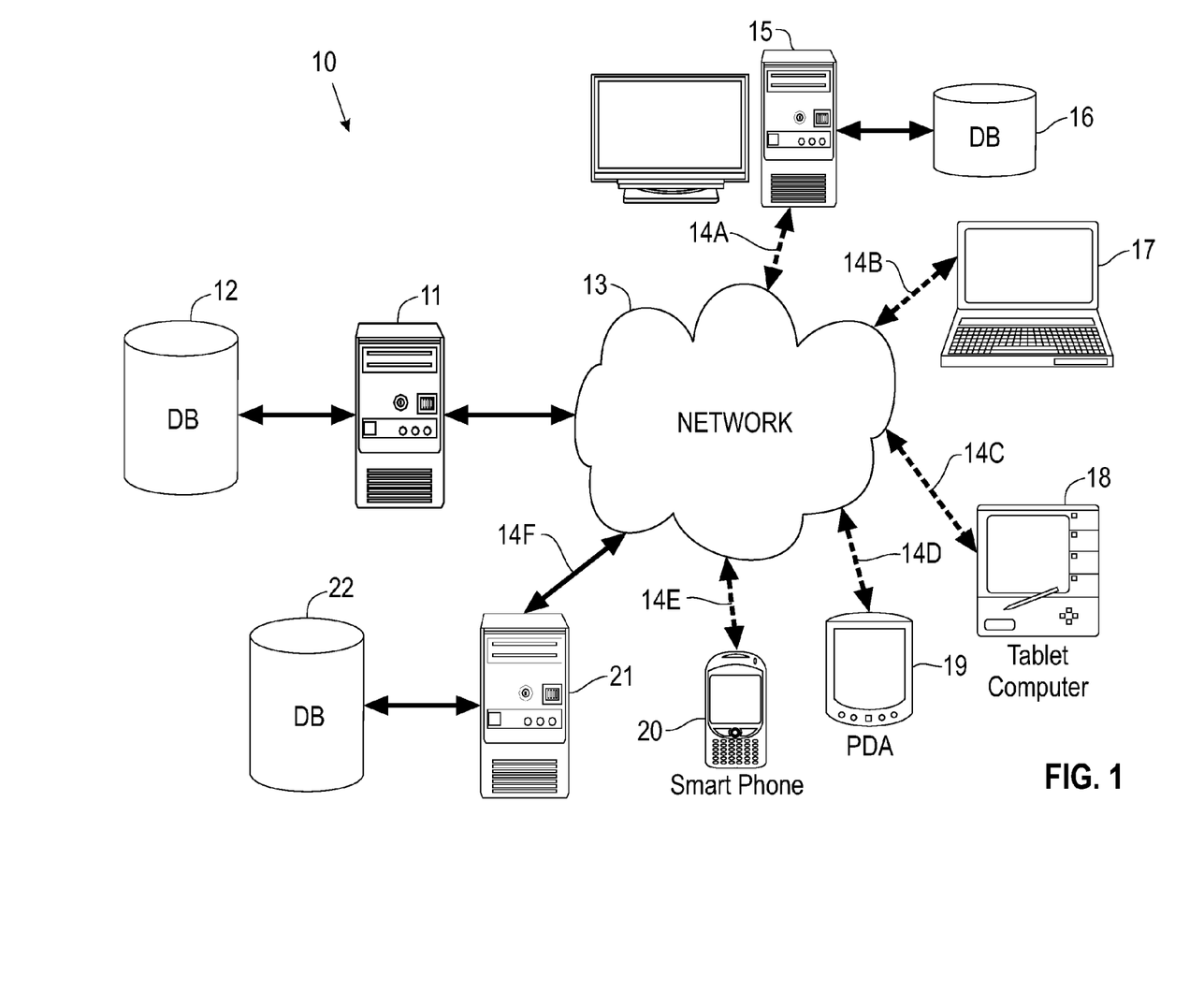
FIG. 1 is a block diagram illustrating an example of the network environment for the snippet based proximal search of the present invention.

Referring now to the drawings, in which like numerals illustrate like elements throughout the several views, FIG. 1 illustrates an example of the basic components of a system 10 using the snippet based proximal search system used in connection with the preferred embodiment of the present invention. The system 10 includes a server 11 and the remote devices 15 and 17-20 that utilize the snippet based proximal search system of the present invention.

Each remote device 15 and 17-20 has applications and can have a local database 16. Server 11 contains application, and a database 12 that can be accessed by remote device 15 and 17-20 via connections 14(A-E), respectively, over network 13. The server 11 runs administrative software for a computer network and controls access to itself and database 12. The remote device 15 and 17-20 may access the database 12 over a network 13, such as but not limited to: the Internet, a local area network (LAN), a wide area network (WAN), via a telephone line using a modem (POTS), Bluetooth, WiFi, WiMAX, cellular, optical, satellite, RF, Ethernet, magnetic induction, coax, RS-485, the like or other like networks. The server 11 may also be connected to the local area network (LAN) within an organization.

The remote device 15 and 17-20 may each be located at remote sites. Remote device 15 and 17-20 include but are not limited to, PCs, workstations, laptops, handheld computers, pocket PCs, PDAs, pagers, WAP devices, non-WAP devices, cell phones, palm devices, printing devices and the like. Included with each remote device 15 and 17-20 is an ability to request relevant material from a large collection of documents. Thus, when a user at one of the remote devices 15 and 17-20 desires to access the snippet based proximal search from the database 12 at the server 11, the remote device 15 and 17-20 communicates over the network 13, to access the server 11 and database 12.

Third party computer systems 21 and databases 22 can be accessed by the snippet based proximal search system 100 on server 11 in order to provide access to additional collections of documents and/or search indexes. Data that are obtained from third party computer systems 21 and database 22 can be stored on server 11 and database 12 in order to provide later access to the user on remote devices 15 and 17-20. It is also contemplated that for certain types of data that the remote devices 15 and 17-20 can access the third party computer systems 21 and database 22 directly using the network 13.

Figure 2:
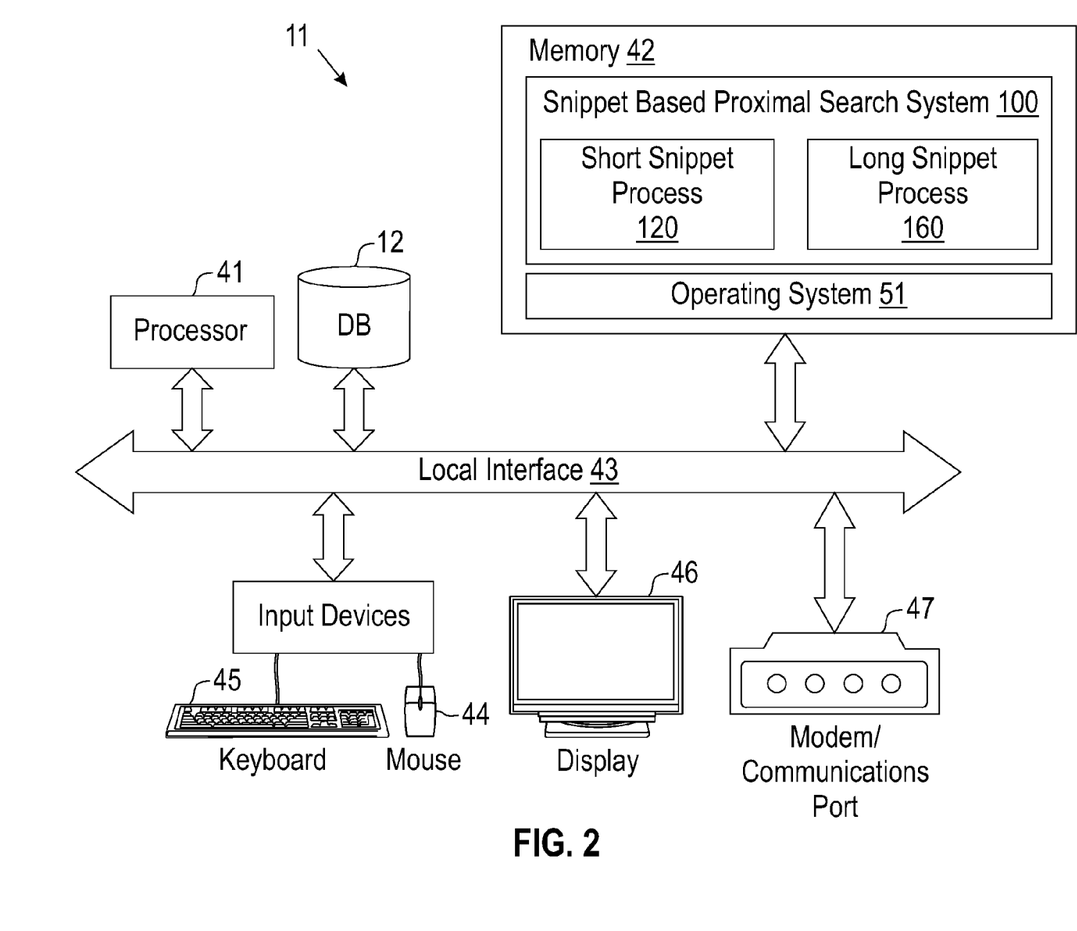
FIG. 2 is a block diagram illustrating an example of a server utilizing the snippet based proximal search of the present invention, as shown in FIG. 1.

Illustrated in FIG. 2 is a block diagram demonstrating an example of server 11, as shown in FIG. 1, utilizing the snippet based proximal search system 100 of the present invention. Server 11 includes, but is not limited to, PCs, workstations, laptops, PDAs, palm devices and the like. The processing components of the third party computer systems 21 are similar to that of the description for the server 11 (FIG. 2).

Generally, in terms of hardware architecture, as shown in FIG. 2, the server 11 includes a processor 41, a computer readable medium such as memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the server 11, and a semiconductor based microprocessor (in the form of a microchip) or a macroprocessor. Examples of suitable commercially available microprocessors are as follows: an 80x86 or Pentium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 42 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 2, the software in the memory 42 includes a suitable operating system (O/S) 51 and the snippet based proximal search system 100 of the present invention. As illustrated, the snippet based proximal search system 100 of the present invention comprises numerous functional components including, but not limited to, the short snippet process 120, and long snippet process 160.

A non-exhaustive list of examples of suitable commercially available operating systems 51 is as follows (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., Symbian OS available from Symbian, Inc., PalmOS available from Palm Computing, Inc., and Windows CE available from Microsoft Corporation).

The operating system 51 essentially controls the execution of other computer programs, such as the snippet based proximal search system 100, and provides scheduling, input-output control, file and data management, memory management, and communication control and related services. However, it is contemplated by the inventors that the snippet based proximal search system 100 of the present invention is applicable on all other commercially available operating systems.

The snippet based proximal search system 100 may be a source program, executable program (object code), script, or any other entity comprising a set of computer program instructions to be performed. When the system 100 is a source program, then the program is usually translated via a compiler, assembler, interpreter, or the like, which may or may not be included within the memory 42, so as to operate properly in connection with the O/S 51. Furthermore, the snippet based proximal search system 100 can be written as (a) an object oriented programming language, which has classes of data and methods, or (b) a procedure programming language, which has routines, subroutines, and/or functions, for example but not limited to, C, C++, C#, Smalltalk, Pascal, BASIC, API calls, HTML, XHTML, XML, ASP scripts, FORTRAN, COBOL, Perl, Java, ADA, .NET, and the like. The computer program instructions may execute entirely on server 11, partly on the server 11, as a stand-alone software package, partly on server 11 and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing remote devices, other files, devices, systems, or a network), a radio frequency (RF) or other transceiver (not shown), a telephonic interface (not shown), a bridge (not shown), a router (not shown), etc.

If the server 11 is a PC, workstation, intelligent device or the like, the software in the memory 42 may further include a basic input output system (BIOS) (omitted for simplicity). The BIOS is a set of essential software routines that initialize and test hardware at startup, start the O/S 51, and support the transfer of data among the hardware devices. The BIOS is stored in some type of read-only-memory, such as ROM, PROM, EPROM, EEPROM or the like, so that the BIOS can be executed when the server 11 is activated.

When the server 11 is in operation, the processor 41 is configured to execute software stored within the memory 42, to communicate data to and from the memory 42, and generally to control operations of the server 11 are pursuant to the software. The snippet based proximal search system 100 and the O/S 51 are read, in whole or in part, by the processor 41, perhaps buffered within the processor 41, and then executed.

When the snippet based proximal search system 100 is implemented in software, as is shown in FIG. 2, it should be noted that the snippet based proximal search system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In an alternative embodiment, where the snippet based proximal search system 100 is implemented in hardware, the snippet based proximal search system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The remote devices 15 and 17-20 provide access to the snippet based proximal search system 100 of the present invention on server 11 and database 12 using for example, but not limited to an Internet browser. The information accessed in server 11 and database 12 can be provided in a number of different forms including but not limited to ASCII data, WEB page data (i.e. HTML), XML or other type of formatted data.

As illustrated, the remote device 15 and 17-20 are similar to the description of the components for server 11 described with regard to FIG. 2. Hereinafter, the remote devices 15 and 17-20 will be referred to as remote devices 15 for the sake of brevity.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 3:
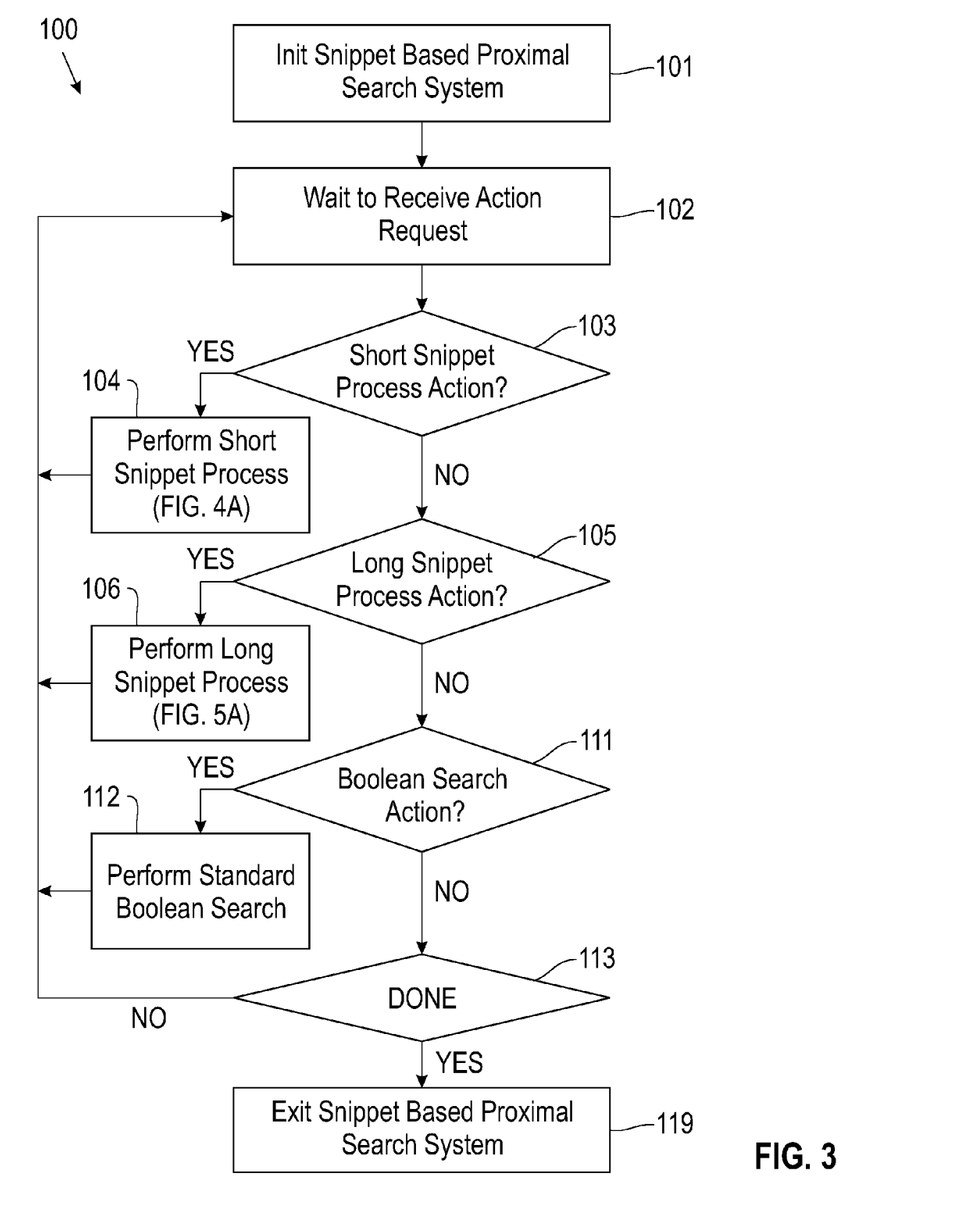
FIG. 3 is a flow chart illustrating an example of the operation of the snippet based proximal search system for the host of the present invention utilized by the server, as shown in FIG. 2.

FIG. 3 is a flow chart illustrating an example of the operation of the snippet based proximal search system 100 of the present invention utilized by the server 11, as shown in FIG. 2. The snippet based proximal search system 100 of the present invention provides a system and methodology for employing search indexes to find nearest snippets to a candidate text snippet within a large document corpus.

First at step 101, the snippet based proximal search system 100 is initialized. This initialization includes the startup routines and processes embedded in the BIOS of the server 11. The initialization also includes the establishment of data values for particular data structures utilized in the snippet based proximal search system 100.

At step 102, the snippet based proximal search system 100 waits to receive an action request. Once an action is received at step 102, it is determined if the action is to perform a short snippet search action at step 103. A short snippet search action occurs when the snippet based proximal search system 100 receives a short text input for a proximity query. In one embodiment, a short text input is approximately in the range of 2-15 words in length. However, in an alternative embodiment, the maximum number of words input may be predetermined by the snippet based proximal search system 100 based on the current utilization of the server 11. If it is determined that the action is not a short snippet search action, then the snippet based proximal search system 100 skips to step 105. However, if it is determined in step 103 that a short snippet search is to be performed, then the snippet based proximal search system 100 performs the short snippet process at step 104. The short snippet process is herein defined in further detail with regard to FIG. 4. After performing the short snippet process, the snippet based proximal search system 100 returns to step 102 to wait to receive the next action.

At step 105, it is determined if the action is a long snippet search action. If it is determined that the action is not a long snippet search action, then the snippet based proximal search system 100 skips to step 111. However, if it is determined in step 105 that the action is a long snippet search, then the snippet based proximal search system 100 performs the long snippet process at step 106. In one embodiment, a text input of approximately more than 15 words in length will activate the long snippet search action. The long snippet process is herein defined in further detail with regard to FIG. 5. After performing the long snippet process, the snippet based proximal search system 100 returns to step 102 to wait to receive the next action.

At step 111, it is determined if the action is a Boolean search action. If it is determined that the action is not a Boolean search action, then the snippet based proximal search system 100 skips to step 113. However, if it is determined at step 111 that it is a Boolean search action, then the snippet based proximal search system 100 performs the standard Boolean search process at step 112. After performing the standard Boolean search process, the snippet based proximal search system 100 returns to step 102 to wait to receive the next action. Boolean searches allow one to combine words and phrases using the words AND, OR, NOT and NEAR (otherwise known as Boolean operators) to limit, widen, or define the search.

At step 113, it is determined if the snippet based proximal search system 100 is to wait for an additional action request. If it is determined at step 113 that the snippet based proximal search system 100 is to wait to receive additional actions, then the snippet based proximal search system 100 returns to repeat steps 102 through 113. However, if it is determined at step 113 that there are no more actions to be received, then the snippet based proximal search system 100 exits at step 119.

Figure 4A:
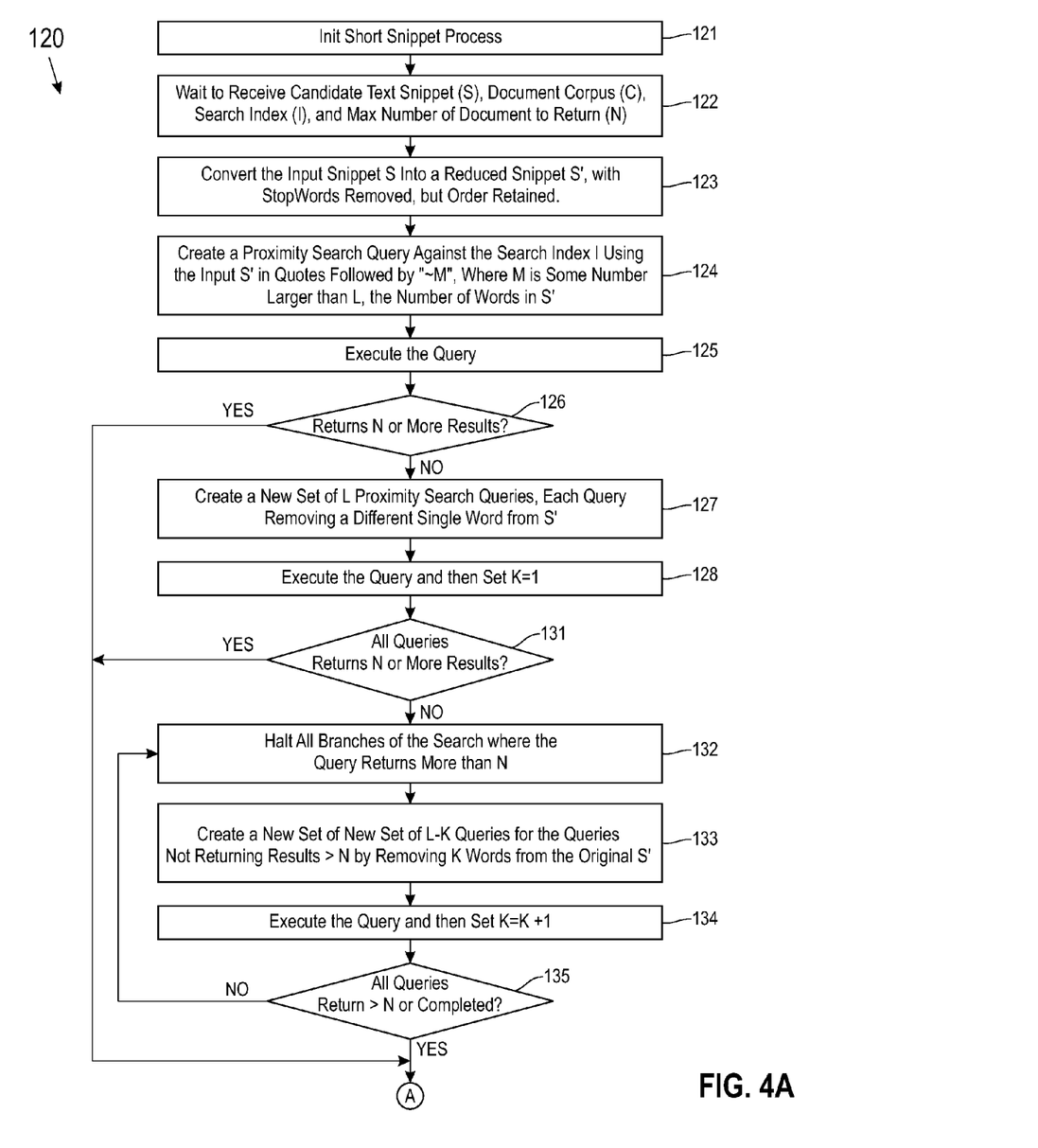
FIGS. 4A and 4B is a flow chart illustrating an example of the operation of the short snippet process on the server that is utilized in the snippet based proximal search system of the present invention, as shown in FIGS. 2 and 3.
Figure 4B:
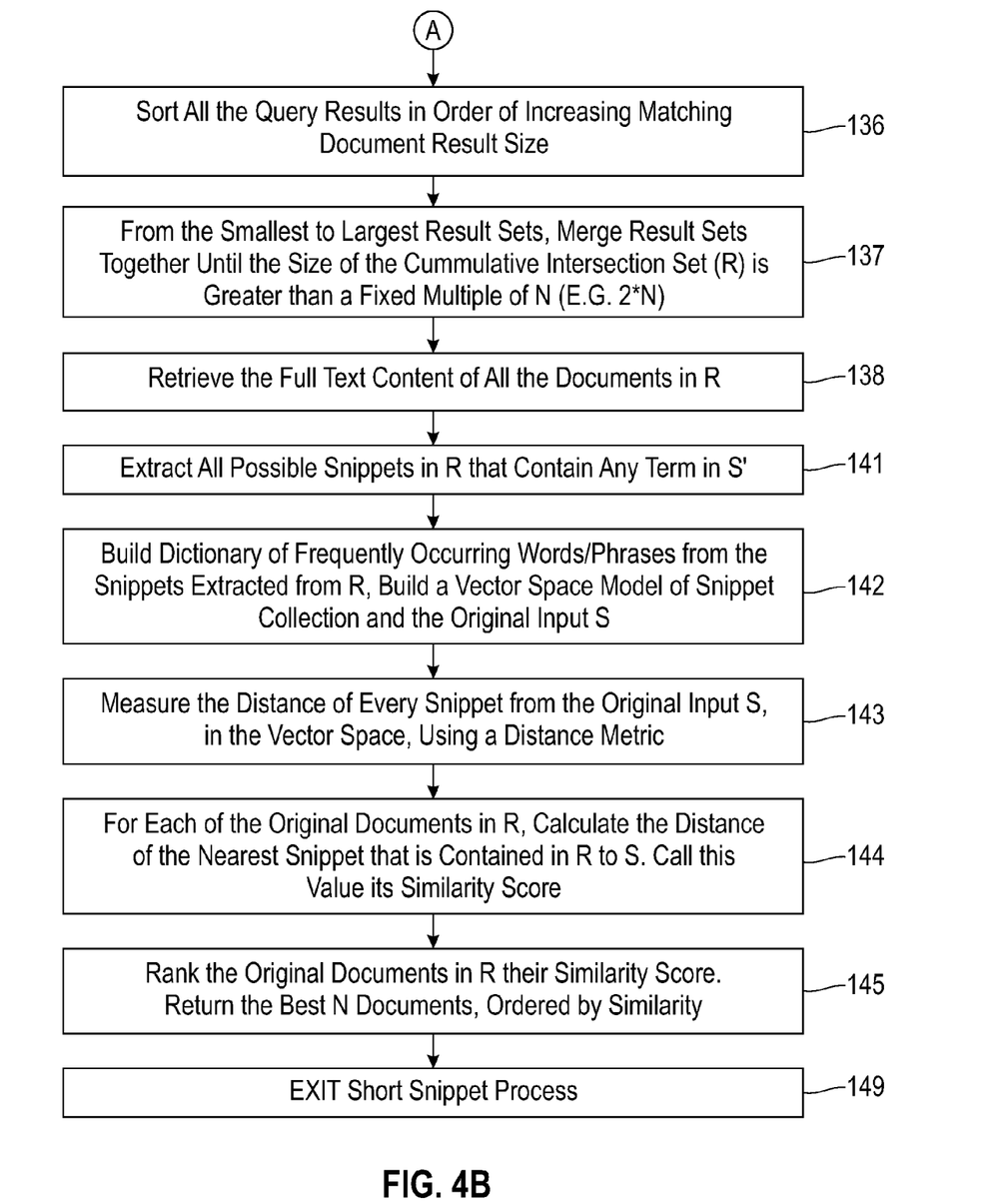

FIGS. 4A and 4B are flow charts illustrating an example of the operation of the short snippet process 120 on the server that is utilized in the snippet based proximal search system 100 of the present invention, as shown in FIGS. 2-3. Given a short text input, the short snippet process 120 first removes the stop words to create the input for a proximity query. This text then becomes the basis of a proximity query. If the query is generally too precise, the query will find few if any matching documents. The query is then made more general by gradually removing terms. First, one term is removed to try every possible query combination containing one fewer words than the original query. Next, two terms are removed, and so on. This produces a query tree, which can be pruned at any point when any particular leaf of the tree generated greater than N results.

Once the query tree is generated, the results are collected by sorting the smallest query to largest (size=number of returned documents). Starting with the smallest query, result sets are included until the collection contains a sufficient candidate population to evaluate. Typically this is around 2*N in size, but the multiple can be adjusted based on how much time is available for the short snippet process 120 to run and how thorough the search.

Once the candidate set is generated, then the full text of the documents is extracted and all snippets that contain any of the terms in the original text input are found. A term vector space model is built with this collection of snippets to find the cosine distance between every snippet vector and the vector representing the text input. A similarity score is assigned to every document by finding the snippet in that document with the best score. This enables the ranking of the candidate documents by returning the best N in order of similarity.

First at step 121, the short snippet process 120 is initialized. This initialization includes the startup routines and processes embedded in the BIOS of the server 11. The initialization also includes the establishment of data values for particular data structures utilized in the short snippet process 120.

At step 122, the short snippet process 120 waits to receive a candidate text search request. The candidate search text request comprises a candidate text snippet (S), document corpus (C), search index (I), and the maximum number of documents to be returned (N). Once a candidate search text request has been received, the short snippet process 120 converts the text snippets S into a reduced snippet S' at step 123. S' consists of all words in S, with stop words removed, but order retained. Stop words is the name given to words that are filtered out prior to processing a search. The words are filtered out because the words are both too common and carry too little meaning to be useful for searching. So, an example snippet: "unlocking the business value in unstructured information" would become: "unlocking business value unstructured information".

At step 124, a proximity search query is created against the search index I using the input S' in quotes followed by "~M". M is some number larger than L, where L is the number of words in S'. This indicates that all the words in S' should occur within a distance of M words of each other. At step 125, the short snippet process 120 execute the query.

At step 126, it is determined if the results of the query is greater than or equal to N, where N is the maximum number of documents to be returned. If it is determined at step 126 that the query has resulted in returning a number of documents greater than or equal to N, then the short snippet process 120 skips to step 136 to sort the query result. However, if it is determined at step 136 that the query has a number of documents returned less than N, then the short snippet process 120 creates a new set of L proximity search queries at step 127. Each of the new set of L proximity search queries is created by removing a different single word form S'. At step 128, all of these L queries are executed. The number of words removed from each query is also documented by setting K=2. Since the L proximity search queries are independent of each other they may be executed in parallel, thus making this approach very scalable. If they are executed sequentially, however, there are efficiencies to be gained by starting in the middle of the search tree, instead of at the beginning. For example, if the search input is 7 words and the search is on every possible 4 words chosen from those 7, any 5 word queries that contain a 4 word query that returned no results can be eliminated.

At step 131, it is determined if any queries return a number of documents more than N. If it is determined at step 131 that any one of the new set of L proximity search queries returns a number of documents more than N, then the short snippet process 120 skips to step 136 to sort the query result. However, if it is determined at step 131 that all of the set of L proximity search queries returned fewer than N results, then the short snippet process 120 creates a new set of L-K queries at step 132. This iteration will cause the removal of 2 words from the original S'. K is also incremented by one to indicate the number of words to be removed if another iteration of word removal is required. At step 133, all of these L-K queries are executed. Since the set of L-K proximity search queries are independent of each other they may be executed in parallel, thus making this approach very scalable. If they are executed sequentially, however, there are efficiencies to be gained by starting in the middle of the search tree, instead of at the beginning.

At step 134, it is determined if any of queries return a number of documents more than N. If it is determined at step 134 that any one of the new set of L-K proximity search queries returns a number of documents more than N, then the short snippet process 120 skips to step 136 to sort the query result. However, if it is determined at step 134 that all of the set of L-K proximity search queries returned fewer than N results, then the short snippet process 120 returns to repeat steps 132 through 135. This continues until all possible query branches have completed or returned a result of size larger than N. At most, this may theoretically result in L^2-1 total queries, however the norm is usually much fewer.

At step 136, a sort of all the query results is performed in order of increasing matching document result size. Starting with the smallest result sets, the short snippet process 120 begins merging result sets together until the cumulative intersection set size is greater than a fixed multiple of N (e.g. 2*N), at step 137. This cumulative intersection set of query results sets is hereafter referred to as R. At step 138, the full text content of all the documents in R is retrieved. At step 141, all possible snippets in R that contain any term in S' are extracted. In one embodiment, the size of the snippets generated from R should be roughly equal to the size of S.

At step 142, a dictionary of frequently occurring words/phrases is built from the snippets extracted from R. Also at step 142, a vector space model of the snippet collection and of the original input S is built. At step 143, the distance in the vector space of every snippet is measured from the original input S. The distance in the vector space is measured using a distance metric. In one embodiment, the distance metric is the cosine distance.

At step 144, the short snippet process 120 calculates the distance of the nearest snippet that is contained in R to S for each of the original documents in R. In one embodiment, this value is called the similarity score. At step 145, each of the original documents in R are ranked by the their similarity score. The short snippet process 120 then returns the best N documents, ordered by similarity. The results are then returned to the remote device 15 requesting the short snippet search.

The short snippet process 120 then exits at step 149.

Figure 5A:
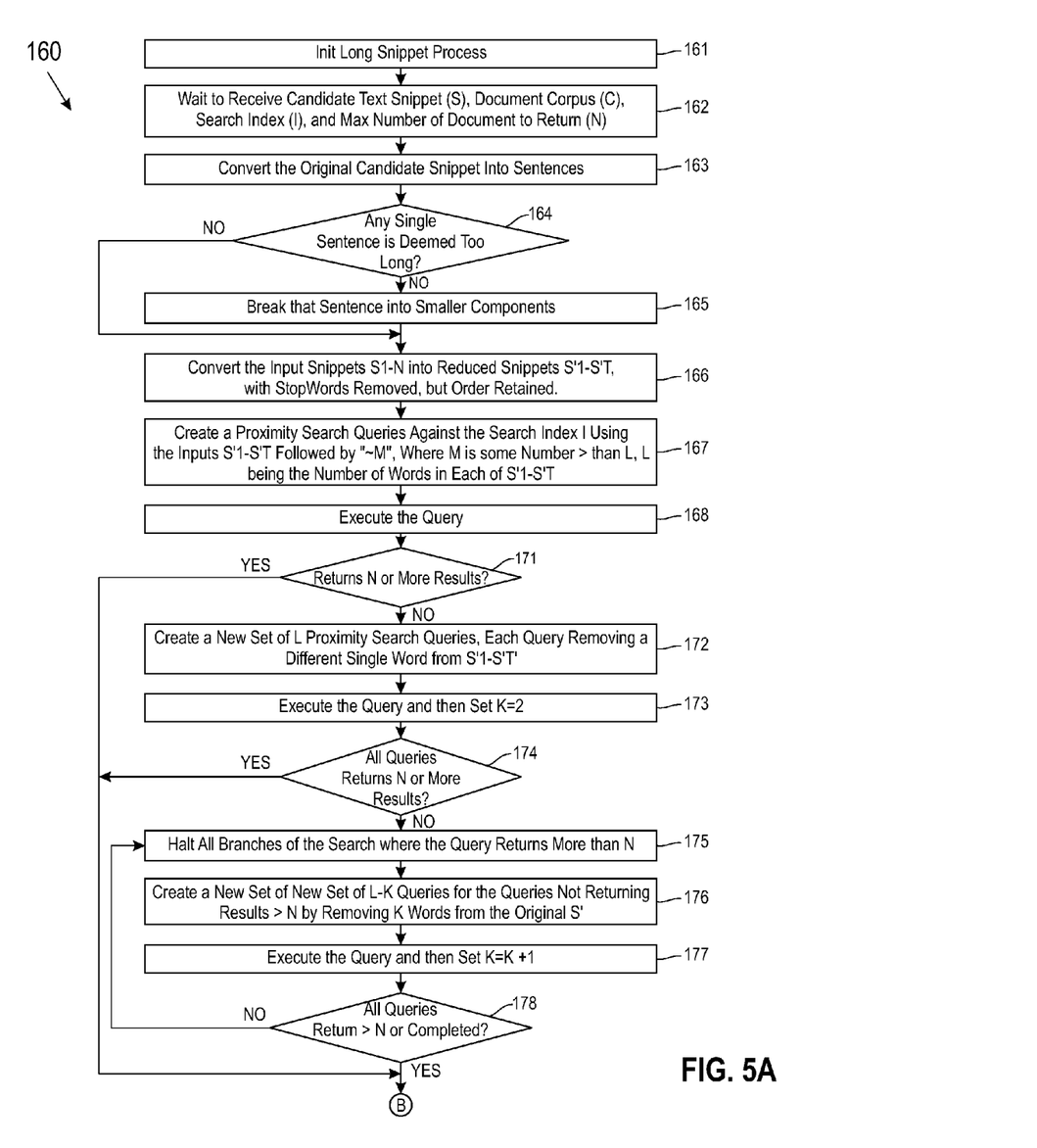
FIGS. 5A and 5B are a flow chart illustrating an example of the operation of the long snippet process on the server that is utilized in the snippet based proximal search system of the present invention, as shown in FIGS. 2-3.
Figure 5B:
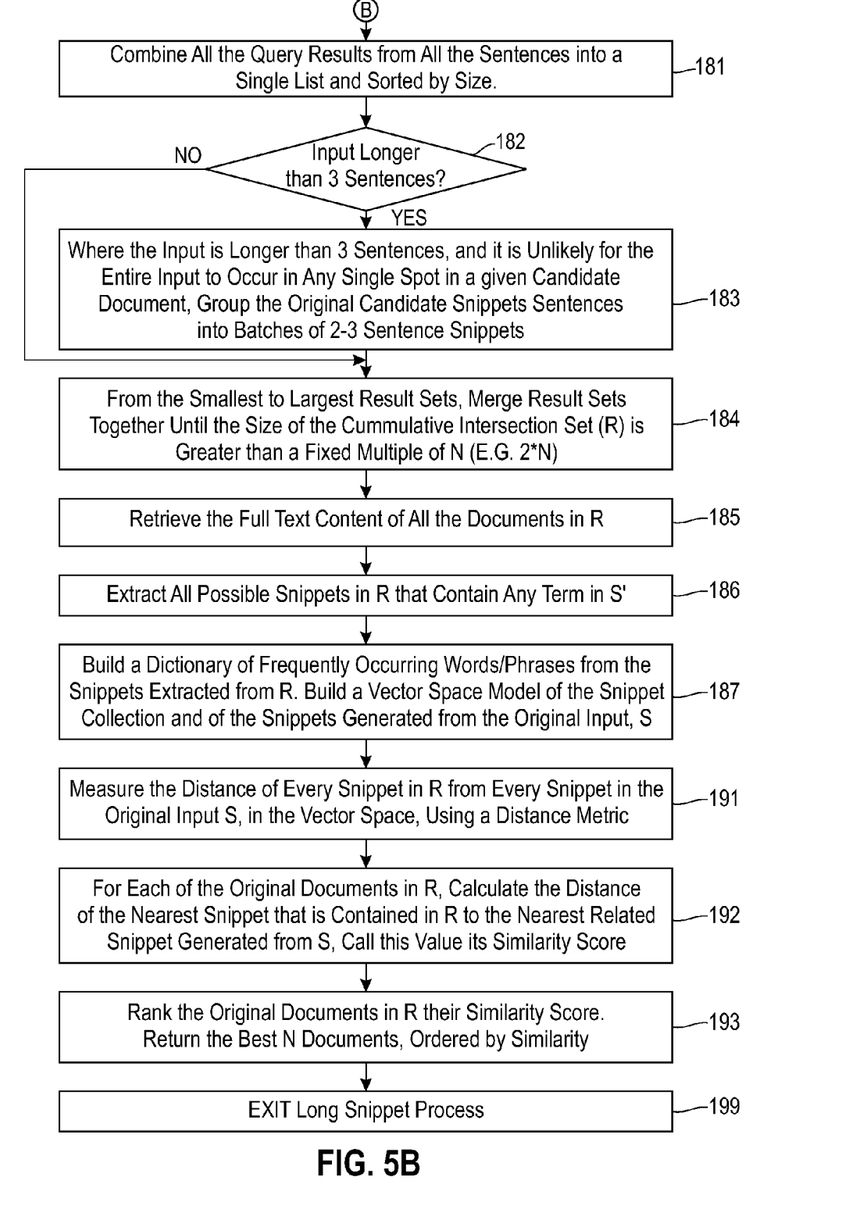

FIGS. 5A and 5B are flow charts illustrating an example of the operation of the long snippet process 160 on the server that is utilized in the snippet based proximal search system 100 of the present invention, as shown in FIGS. 2 and 3. Given a text input of arbitrary length has search terms, the technique disclosed in the short snippet process 120 is used iteratively in the long snippet process 160 to find the document with the best match of any snippet contained within the input text. First, the input text is segmented into sentences. If any individual sentence is too long, the sentence is segmented again. This additional segmentation can be based on for example, but not limited to, punctuation (i.e. such as commas), or simply by taking contiguous words arbitrarily separated at regular intervals.

Next, techniques similar to those described with regard to the short snippet process 120 are used to generate proximate queries and sub-queries from the input sentences. Then, all the query results from all the sentences are combined and sorted by size of the return set. Candidate documents are selected from those documents from the smallest return sets, those documents that are returned more frequently or some combination of the two.

From the candidate set, a vector space model of snippets is created as before. The score for each snippet is created by comparing each candidate vector to every snippet that can be created from the input text. The best similarity score is the score given to each snippet. The documents are then ranked by the best similarity score for their respective snippets. The best N documents are the returned in ranked order.

First at step 161, the long snippet process 160 is initialized. This initialization includes the startup routines and processes embedded in the BIOS of the server 11. The initialization also includes the establishment of data values for particular data structures utilized in the long snippet process 160.

At step 162, the long snippet process 160 waits to receive a candidate text search request. The candidate search text request comprises a candidate text snippet (S), document corpus (C), search index (I), and the maximum number of documents to be returned (N). Once a candidate search text request has been received, the long snippet process 160 converts the original candidate snippet into sentences, at step 163. At step 164, it is determined if any single sentence is deemed too long (i.e., too many words to generate a practical number of queries). If it is determined at step 164 that no single sentence is deemed too long, then the long snippet process 160 skips to step 166. However, if it is determined at step 164 that any single sentence is deemed too long, then that sentence is broken into smaller components at step 165. In one embodiment, the sentence is broken into smaller components by using punctuation cues or arbitrary equal length splits.

At step 166, the long snippet process 160 converts the text snippets S1-SN into a reduced snippet S'1-S'T. S' consists of all words in S'1-S'T, with stop words removed, but order retained. At step 167, multiple proximity search queries are created against the search index I using the input S'1-S'T in quotes followed by "~M". M is some number larger than L, where L is the number of words in S'1-S'T. This indicates that all the words in S'1-S'T should occur within a distance of M words of each other. At step 168, the long snippet process 160 execute the search queries. Since the set of S'1-S'T proximity search queries are independent of each other they may be executed in parallel, thus making this approach very scalable. If they are executed sequentially, however, there are efficiencies to be gained by starting in the middle of the search tree, instead of at the beginning.

At step 171, it is determined if the results of the multiple proximity search queries is greater than or equal to N, where N. is the maximum number of documents to be returned. If it is determined at step 171 that the multiple proximity search queries resulted in returning a number of documents greater than or equal to N, then the long snippet process 160 skips to step 181 to sort the query result. However, if it is determined at step 171 that the multiple proximity search queries have number of documents returned less than N, then the long snippet process 160 creates a new set of L proximity search queries at step 172. Each of the new set of L proximity search queries is each a query created by removing a different single word form S'1-S'T. At step 173, all of these L queries are executed. The number of words removed from each query is also documented by setting K=2. Since the set of L proximity search queries are independent of each other they may be executed in parallel, thus making this approach very scalable. If they are executed sequentially, however, there are efficiencies to be gained by starting in the middle of the search tree, instead of at the beginning.

At step 174, it is determined if any L proximity search queries return a number of documents more than N. If it is determined at step 174 that any one of the new set of L proximity search queries returns a number of documents more than N, then the long snippet process 160 skips to step 181 to sort the query result. However, if it is determined at step 174 that all of the set of L proximity search queries returned fewer than N results, then the long snippet process 160 creates a new set of L-K queries at step 172. This iteration will cause the removal of 2 words from the original S'1-S'T. K is also incremented by one to indicate the number of words to be removed if another iteration of word removal is required. At step 177, all of these L-K queries are executed. Since the set of L-K proximity search queries are independent of each other they may be executed in parallel, thus making this approach very scalable. If they are executed sequentially, however, there are efficiencies to be gained by starting in the middle of the search tree, instead of at the beginning.

At step 178, it is determined if any of the L-K queries return a number of documents more than N. If it is determined at step 178 that any one of the new set of L-K proximity search queries returns a number of documents more than N, then the long snippet process 160 skips to step 181 to sort the query result. However, if it is determined at step 178 that all of the set of L-K proximity search queries returned fewer than N results, then the long snippet process 160 returns to repeat steps 175 through 178. This continues until all possible query branches have completed or returned a result of size larger than S'1-S'T.

At step 181, all of the query results from all the sentences are combined into a single list, and a sort of all the query results is performed in order of increasing matching document result size. At step 182, the long snippet process 160 determines if the input is longer than a predetermined number of sentences. In one embodiment, the predetermined number of sentences. If it is determined at step 182 that the input is not longer than three sentences, then the long snippet process 160 skips to step 184. However, if it is determined at step 182 that the input is longer than three sentences, then the original candidate snippets sentences are grouped into batches of 2 or 3 sentence snippets at step 183. This is only necessary in cases where the input is longer than 3 sentences, and the concern is that it is unlikely for the entire input to occur in any single spot in a given candidate document. Breaking the input up in this way allows for partial matches to the original input to be found wherever they may occur.

Starting with the smallest result sets, the long snippet process 160 begins merging result sets together until the cumulative intersection set size is greater than a fixed multiple of N (e.g. 2*N), at step 184. This cumulative intersection set of query results sets is hereafter referred to as R. At step 185, the full text content of all the documents in R is retrieved. At step 186, all possible snippets in R that contain any term in S'1-S'T are extracted. In one embodiment, the size of the snippets generated from R should be roughly equal to the size of S.

At step 187, a dictionary of frequently occurring words/phrases is built from the snippets extracted from R. Also at step 187, a vector space model of the snippet collection and of the original input S is built. At step 191, the distance in the vector space of every snippet is measured from the original input S. The distance in the vector space is measured using a distance metric. In one embodiment, the distance metric is the cosine distance.

At step 192, the long snippet process 160 calculates the distance of the nearest snippet that is contained in R to S for each of the original documents in R. In one embodiment, this value is called the similarity score. At step 193, each of the original documents in R are ranked by the their similarity score. The long snippet process 160 then returns the best N documents, ordered by similarity. The results are then returned to the remote device 15 requesting the long snippet search.

The long snippet process 160 then exits at step 199.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A method for searching a collection of documents comprising:
    using at least one input text snippet and an index for the documents directed to both words and proximity of words;
    ranking the documents based on whether the documents include text that is similar to said at least one input text snippet, said ranking comprising:
        i) automatically generating multiple proximity queries for said at least one input text snippet comprising multiple combinations of words included in said at least one input text snippet;
        ii) submitting the generated proximity queries to each of the documents; and
        iii) collecting the documents resulting from the proximity queries;
    selecting a plurality of highest ranked documents to form a subset of documents;
    extracting snippets from each document in the subset of documents;
    creating a vector space model for a set defined by a union of the extracted snippets and said at least one input text snippet, the vector space model including vectors that represent a frequency measure of terms in the set;
    ranking the extracted snippets according to their respective vector distances from said at least one input text snippet; and
    ranking the documents within the subset of documents based on the number of the generated multiple proximity queries for each input text snippet that match each of the documents.

2. The method of claim 1, wherein the step of ranking the documents based on whether the documents include text further comprises:
    determining if the number of documents resulting from the proximity queries exceeds a predetermined amount.

3. The method of claim 2, wherein the step of ranking the documents based on whether the documents include text further comprises:
    automatically generating reduced word set proximity queries for each of the proximity queries, wherein the reduced word set proximity queries remove a different single word from said at least one input text snippet for each of the proximity queries when the number of documents resulting from the queries does not exceed the predetermined amount; and
    creating a query tree from the reduced word set proximity queries.

4. The method of claim 2, wherein the step of ranking the documents based on whether the documents include text further comprises:
    automatically generating reduced word set proximity queries for each of the proximity queries, wherein the reduced word set proximity queries remove a different combination of words from said at least one input text snippet for each of the proximity queries when the documents resulting from the queries does not exceed the predetermined amount.

5. The method of claim 1, further comprising:
    determining if said at least one input text snippet exceeds a predetermined number of words.

6. The method of claim 5, further comprising:
    breaking up said at least one input text snippet to form a subset of input text snippets, wherein said at least one input text snippet exceeds the predetermined number of words.

7. The method of claim 6, further comprising:
    determining if said subset of input text snippets exceeds a predetermined number; and
    grouping said subset of input text snippets into batches of input text snippets.

8. A computer-implemented system for searching a collection of documents by using at least one input text snippet, and an index for the documents directed to both words and proximity of words, comprising:
    a computer processor;
    a ranking module that ranks the documents using the computer processor based on whether the documents include text that is similar to said at least one input text snippet, said ranking comprising:
        i) a proximity generation module that automatically generates proximity queries comprising multiple combinations of words included in said at least one input text snippet;
        ii) a query module that submits the generated proximity queries to each of the documents; and iii) a collection module that collects the documents resulting from the proximity queries;

a selection module that selects a plurality of highest ranked documents to form a subset of documents;

an extraction module that extracts snippets from each document in the subset of documents;

a vector space model module that creates a vector space model for a set defined by a union of the extracted snippets and said at least one input text snippet, the vector space model module including vectors that represent a frequency measure of terms in the set;

a snippet ranking module that ranks the extracted snippets according to their respective vector distances from said at least one input text snippet; and a document ranking module that ranks the documents within the subset of documents based on the number of the generated proximity queries that match each of the documents.

9. The system of claim 8, wherein the ranking module determines if the number of documents resulting from the queries exceeds a predetermined amount.

10. The system of claim 9, wherein the proximity generation module automatically generates a reduced word proximity query for one of the proximity queries and previously generated reduced word proximity queries, wherein a different single word is repeatedly removed from said at least one input text snippet for the one of the proximity queries until the documents resulting from the reduced word proximity query exceeds the predetermined amount.

11. The system of claim 9, wherein the proximity generation module automatically generates reduced word set proximity queries for each of the proximity queries, wherein the reduced word set proximity queries remove a different combination of words from said at least one input text snippet for each of the proximity queries when the documents resulting from the queries does not exceed the predetermined amount.

12. The system of claim 8, further comprising:

a snippet module that determines if said at least one input text snippet exceeds a predetermined number of words.

13. The system of claim 12, wherein the snippet module breaks-up said at least one input text snippet to form a subset of input text snippets, wherein said at least one input text snippet exceeds the predetermined number of words 14. The system of claim 13, wherein the snippet module determines if said subset of input text snippets exceeds a predetermined number, and groups said subset of input text snippets into batches of input text snippets.

15. A computer program product for searching a collection of documents by using at least one input text snippet, and an index for the documents directed to both words and proximity of words, the computer program product comprising:

a non-transitory storage medium readable by a computer system and storing instructions for execution by the computer system for performing a method comprising:

ranking the documents based on whether the documents include text that is similar to said at least one input text snippet, said ranking comprising:

i) automatically generating proximity queries of multiple combinations of words included in said at least one input text snippet;

ii) submitting the generated proximity queries to each of the documents; and iii) collecting the documents resulting from the proximity queries;

selecting a plurality of highest ranked documents to form a subset of documents;

extracting snippets from each document in the subset of documents;

creating a vector space model for a set defined by a union of the extracted snippets and said at least one input text snippet, the vector space model including vectors that represent a frequency measure of terms in the set;

ranking the extracted snippets according to their respective vector distances from said at least one input text snippet; and ranking the documents within the subset of documents based on the number of the generated proximity queries that match each of the documents.

16. The computer program product of claim 15, further comprising:

automatically generating reduced word set proximity queries for each of the proximity queries, wherein the reduced word set proximity queries remove a different single word from said at least one input text snippet for each of the proximity queries;

creating a query tree from the reduced word set proximity queries; and pruning the query tree when a leaf of the query tree generates greater than a predetermined number of documents.

17. The computer program product of claim 15, further comprising:

automatically generating reduced word set proximity queries for each of the proximity queries, wherein the reduced word set proximity queries remove a different combination of the same number of words from said at least one input text snippet for each of the proximity queries when the documents resulting from the queries does not exceed a predetermined amount.

18. The computer program product of claim 15, further comprising breaking up said at least one input text snippet to form a subset of input text snippets, wherein said at least one input text snippet exceeds a predetermined number of words.

19. The computer program product of claim 18, further comprising determining if said subset of input text snippets exceeds a predetermined number; and grouping said subset of input text snippets into batches of input text snippets.

* * * * *